United States Patent [19]
Ryan

[11] Patent Number: 6,025,432
[45] Date of Patent: *Feb. 15, 2000

[54] HIGH STANDARD VISCOSITY QUATERNARY MANNICH MICROEMULSIONS

[75] Inventor: Michael Stephen Ryan, Fairfield, Conn.

[73] Assignee: Cytec Technology Corp., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/898,746

[22] Filed: Jul. 23, 1997

Related U.S. Application Data

[63] Continuation of application No. 08/658,678, Jun. 4, 1996, abandoned, which is a continuation of application No. 08/416,419, Apr. 4, 1995, abandoned.

[51] Int. Cl.$^7$ ...................................................... C08L 39/00
[52] U.S. Cl. .......................... 524/555; 524/812; 524/815; 524/827
[58] Field of Search ..................................... 524/555, 812, 524/815, 827

[56] References Cited

U.S. PATENT DOCUMENTS

| | | | |
|---|---|---|---|
| 4,010,131 | 3/1977 | Phillips et al. | 260/29.4 UA |
| 4,079,027 | 3/1978 | Phillips et al. | 260/29.4 UA |
| 4,956,399 | 9/1990 | Kozakiewicz et al. | 523/223 |
| 5,627,260 | 5/1997 | Huang et al. | 524/555 X |
| 5,670,615 | 9/1997 | Huang et al. | 524/555 X |

*Primary Examiner*—Judy M. Reddick
*Attorney, Agent, or Firm*—Joseph J. Mallon; Frank M. Van Riet

[57] ABSTRACT

Inverse microemulsions are disclosed wherein the dispersed micelles containing water and an (alk)acrylamide-based polymer substituted with at least one mole percent of quaternized tertiary aminomethyl groups i.e. the aqueous phase, contain from about 20 percent to about 40 percent, by weight, of polymer solids and the microemulsion has a Standard Viscosity of at least about 3.3 cps. A method of making said microemulsions and use thereof to dewater dispersions of suspended solids are also taught.

5 Claims, No Drawings

6,025,432

HIGH STANDARD VISCOSITY QUATERNARY MANNICH MICROEMULSIONS

This is a continuation of application Ser. No. 08/658,678, filed on Jun. 4, 1996, now abandoned, which is, in turn, a continuation of Ser. No. 08/416,419 filed on Apr. 4, 1995, now abandoned.

BACKGROUND OF THE INVENTION

Microemulsions of high molecular weight, quaternized Mannich polyacrylamides are well known as taught in U.S. Pat. Nos. 4,956,399; 5,037,881 and 5,132,023 as well as methods for their production and use to dewater dispersions of suspended solids.

These microemulsions have proven to be very commercially successful, particularly in the dewatering of municipal and industrial sludges such as sewage sludge. The high molecular weight of the quaternized Mannich polymers and the capability of controlling the concentration of the quaternized aminomethyl groups of the polymers have contributed to the products' success.

One of the problems experienced by these microemulsions, however, is their relative inability to dewater suspended solids dispersions which are of low solids content. Dispersions of suspended solids of lower solids content require dewatering additives which possess a higher Standard Viscosity than those commonly employed in some dewatering applications. That is to say, most high molecular weight, quaternized Mannich polymer microemulsions commercially sold possess a Standard Viscosity of about 3.0 cps. and below and, as such, are not as effective for dewatering low solids dispersions as would be desired.

High molecular weight, quaternized Mannich polymer microemulsions are prepared by reacting an (alk)acrylamide polymer backbone, in microemulsion form, with formaldehyde and a secondary amine, usually in the form of a complex, e.g. N,N-dimethylaminomethanol, and then quaternizing the resulting Mannich polymer base. During the reaction of the backbone with the formaldehyde/secondary amine to form the Mannich, the Standard Viscosity of the resultant Mannich polymer microemulsion is normally equal to or slightly greater than that of the starting (alk)acrylamide polymer backbone microemulsion. However, further reaction of the Mannich polymer base with the quaternizing agent reduces the Standard Viscosity of the microemulsion of the quaternized Mannich polymer to a value below that of the original backbone polymer microemulsion.

Because of the loss of the Standard Viscosity (S.V.) during the quaternization of the Mannich polymer, it has usually been the case to attempt to make the Standard Viscosity of the backbone polymer as high as possible. This has usually been accomplished by employing the amount of chain-transfer agent which enables the production of the optimum Standard Viscosity of the backbone polymer which is not subject to drastic reduction during the quaternization procedure. It has been found that the S.V. of the quaternized polymer microemulsion falls off on both sides of this optimum concentration of chain-transfer agent i.e. a plot of the S.V. and chain-transfer agent concentration is parabolic-like in shape. Thus, there is a limit as to the highest S.V. which can be attained for each and every polymer backbone using this production procedure.

Because the quaternized, Mannich polymer microemulsion is comprised of much more than the polymer per se i.e. emulsifier, water, oil, etc., the tendency has also been to produce the quaternized, Mannich polymer microemulsion at as high a polymer solids content as possible so as to save on costs of shipment. Thus, the polymer solids content is normally over 42% by weight, of the aqueous phase of the microemulsion. At such high polymer solids content, the Standard Viscosity of the resultant microemulsion attainable is restricted.

Since the Standard Viscosity of the microemulsion of the quaternized, high molecular weight polymer should be as high as possible for many applications, and since it is very difficult to prepare (alk)acrylamide polymer backbone microemulsions at higher Standard Viscosities, the need exists for polymers of high molecular weight, quaternized Mannich polymer microemulsions having standard Viscosities which enable them to effectively dewater low solids containing dispersions, i.e. those having Standard Viscosities above about 3.3 cps.

The ability to supply high Standard Viscosity, quaternized, Mannich polymer microemulsions which effectively dewater low solids-containing dispersions would provide a benefit to industry which would receive favorable recognition and acceptance.

SUMMARY OF THE INVENTION

Applicant has now found that microemulsions of high molecular weight, quaternized, Mannich polymers can be prepared, which microemulsions have Standard Viscosities of over about 3.3 cps and, as a result, are effective for the dewatering of low solids containing dispersions.

Contrary to previous belief, Applicant has found that if the (alk)acrylamide-based polymer backbone microemulsion is produced at an aqueous phase polymer solids content ranging between about 20% and about 40%, by weight, and the Mannich polymer thereof is quaternized, the Standard Viscosity of the resultant quaternized Mannich polymer microemulsion is higher than when the backbone microemulsion is prepared at higher aqeuous phase polymer solids. This result is indeed surprising because it was always thought that lowering solids in the backbone polymer microemulsion aqueous phase would result in a lowering of the Standard Viscosity of the quaternized, Mannich polymer microemulsion.

Thus, Applicant has surprisingly found that controlling the aqueous phase polymer solids content of the backbone polymer, independent of the presence or absence of chain-transfer agent, between about 20% to about 40%, by weight, unexpectedly results in the formation of a backbone polymer microemulsion which, when subjected to a Mannich reaction and subsequently quaternized, enables the production of a quaternized, Mannich polymer microemulsion having a Standard Viscosity of over about 3.3 cps.

DESCRIPTION OF THE INVENTION INCLUDING PREFERRED EMBODIMENTS

The instant invention relates to an inverse microemulsion comprising an aqueous phase of dispersed micelles containing water and an (alk)acrylamide-based polymer substituted with at least 1 mole percent of quaternized tertiary aminomethyl groups, wherein said microemulsion is derived from a microemulsion containing greater than about 20 percent, by weight, and less than about 40 percent, by weight, of aqueous phase polymer solids, based on said microemulsion, and having a Standard Viscosity of at least about 3.3 cps.

The invention further relates to a method of dewatering a dispersion of suspended solids by the addition to said dispersion of a quaternized Mannich (alk)acrylamide-based polymer, wherein said polymer is derived from a microemulsion containing greater than about 20 percent, by weight, and less than about 40 percent, by weight, of aqueous phase polymer solids, and having a Standard Viscosity of at least about 3.3 cps.

Additionally, the invention relates to a process for the preparation of a microemulsion comprising micelles which contain water and an (alk)acrylamide-based polymer substituted with at least about 1 mole percent of quaternized aminomethyl groups which comprises:

a) admixing
(i) an aqueous solution of at least one (alk)acrylamide monomer, optionally, at least one ethylenically unsaturated comonomer and, optionally, a chain transfer agent;
(ii) an oil solution comprising at least one hydrocarbon liquid; and
(iii) an effective amount of a surfactant or surfactant mixture so as to form a microemulsion;

b) subjecting the microemulsion obtained in step (a) to polymerization conditions;

c) reacting the polymerized polymer obtained in step (b) with an effective amount of a formaldehyde and a secondary amine or complex thereof; and d) quaternizing the resultant polymer;

wherein, in step (a) (iii) the monomer solids concentration of the aqueous phase ranges from about 20 to about 40 percent and the microemulsion resulting from step (d) has a Standard Viscosity of at least about 3.3 cps.

According to the present invention, there is provided microemulsions comprising (alk)acrylamide-containing polymeric microparticles, the (alk)acrylamide polymer being substituted with at least about 1 mole percent of tertiary aminomethyl groups. The micelles of the microemulsion have a weight average diameter of less than about 1000 Å, preferrably, from about 200 to about 1000 Å in diameter. It is more preferred that the average particle size range from about 300 to about 1000 Å in diameter and most preferred that it ranges from about 350 to 1000 Å in diameter.

The above defined compositions preferrably comprise polyacrylamide as the backbone polymer which is substituted with said aminomethyl groups.

Polymerization, according to the present invention, is carried out by the addition of a polymerization initiator to the aqueous phase or by subjecting the inverse monomer microemulsion to ultraviolet or ionizing irradiation at a temperature ranging from about 30 to 45° C.

Especially preferred is the invention wherein the formaldehyde comprises formalin and the secondary amine comprises dimethylamine. It is also contemplated to employ a formaldehyde-secondary amine complex such as N,N-dimethylaminomethanol. Most preferred is a mixture of paraformaldehyde and N,N-dimethylaminomethanol.

The ratio of formaldehyde to amine is not critical and should range from about 1.5:1 to 1:10, by mole, respectively. It is generally preferred, however, to use a molar ratio as close to 1:1 as practical. A sufficient quantity of the amine and formaldehyde or complex thereof is required to impart at least 1 mole percent of the tertiary aminomethyl groups to the acrylamide backbone polymer.

The backbone of the Mannich acrylamide polymers of the present invention may comprise units of such (alk) acrylamides as acrylamide, methacrylamide, ethacrylamide and the like.

The backbones of the Mannich acrylamide polymers of the present invention may also comprise an (alk)acrylamide copolymerized with a cationic or non-ionic, water-soluble, ethylenically unsaturated comonomer in amounts up to about 90%, by weight, based on the total weight of monomers. Water-soluble, anionic comonomers may also be used in substantially lower amounts.

Useful cationic monomers include diallyldialkylammonium chlorides, N,N-dialkylaminoalkyl(meth)acrylates, N,N-dialkylaminoalkyl(meth)acrylamides, salts, quaternaries and mixtures thereof and the like.

Anionic monomers useful in the practice of this invention may comprise acrylic or methacrylic acid, furmaric acid, crotonic acid; maleic acid, salts thereof; 2-acrylamido-2-methylpropane sulfonic acid; styrene sulfonic acid and their salts and the like in amounts of up to about 10%, by weight, based on the total weight of monomers.

Water-soluble, non-ionic monomers, suitable in the practice of this invention, generally comprise N-vinyl pyrrolidone, N,N-dialkylmethacrylamide and the like. Small quantities, i.e. up to about 10%, by weight, of other copolymerizable monomers, such as methyl acrylate; methyl methacrylate; acrylonitrile; vinyl acetate; styrene etc. may also be used.

Formaldehydes suitable for use in this invention, as mentioned above, are selected from formaldehyde; paraformaldehyde; trioxane; aqueous formalin and mixtures thereof. Secondary amines suitable for use in the practice of this invention are selected from those containing from about 2 to about 4 carbon atoms which are aliphatic, cyclic, straight chained or branched.

Useful secondary amines are those which are the most hydrophilic e.g. dimethylamine, ethanolmethylamine, methylethylamine, diethylamine, ethanolethylamine, diethanolamine or mixtures thereof. Dimethylamine is preferred.

The compositions of the present invention are prepared using inverse microemulsion polymerization as taught in the above-identified U.S. patents, hereby incorporated herein by reference.

In general, microemulsion polymerization processes are conducted by (i) preparing a monomer microemulsion by mixing an aqueous solution of monomers with a hydrocarbon liquid containing an appropriate surfactant or surfactant mixture to form an inverse microemulsion consisting of small aqueous monomer micelles dispersed in the continuous oil phase and (ii) subjecting the monomer microemulsion to free radical polymerization.

In order to obtain an inverse microemulsion, it is generally necessary to use particular conditions whose main parameters are as follows: surfactant concentration, HLB of surfactant or surfactant mixture, temperature, nature of the organic phase and composition of the aqueous phase.

The aqueous monomer solution may contain such conventional additives as are desired. For example, the solution may contain chelating agents to remove polymerization inhibitors, chain-transfer agents, pH adjusters, initiators and other conventional additives. The use of chain-transfer agents herein is preferred. More preferred is the use of a chain-transfer agent at a concentration of less than about 0.2% by weight, based on the weight of monomer in the aqueous solution, preferably about 0.05 to about 0.15%, by weight same basis.

Essential to the formation of the microemulsion, which may be defined as a transparent and thermodynamically stable solution, comprising two liquids insoluble in each other and a surfactant, in which the micelles are usually 2000 Å or less in diameter, is the selection of appropriate organic phase and surfactant.

The selection of the organic phase has a substantial effect on the minimum surfactant concentration necessary to obtain the inverse microemulsion and may consist of a hydrocarbon or hydrocarbon mixture. Isoparaffinic hydrocarbons or mixtures thereof are the most desirable in order to obtain inexpensive formulations. Typically the organic phase will comprise mineral oil, toluene, fuel oil, kerosene, odorless and mineral spirits, mixtures of any of the foregoing and the like.

The ratio of weight of the amounts of aqueous phase and hydrocarbon phase is chosen as high as possible, so as to obtain, after polymerization, a microemulsion of high polymer content. Practically, this ratio may range, for example from about 0.5 to about 3:1, and usually approximates 1:1.

The one or more surfactants are selected in order to obtain an HLB (Hydrophilic Lipophilic Balance) value ranging from about 8 to about 12. Outside this range, formation of inverse microemulsions generally cannot be attained. In addition to the appropriate HLB value, the concentration of surfactant must be optimized, i.e., be sufficient to form an inverse microemulsion. Too low a concentration of surfactant leads to the formation of standard inverse emulsions and too high a concentration results in increased costs and does not impart any significant benefit. Typical surfactants useful in the practice of this invention may be anionic, cationic or nonionic. Preferred surfactants include sorbitan monooleate, polyoxyethylene (20) sorbitan monooleate, sodium dioctylsulfosuccinate, polyoxyethylenesorbitol hexaoleate, oleamidopropyldimethyl amine, sodium isostearyl-2-lactate and the like.

Polymerization of the microemulsion may be carried out in any manner known to those skilled in the art. Initiation may be effected with a variety of thermal and redox free radical initiators, including peroxides, e.g. t-butyl peroxide; azo compounds, e.g. azobisisobutyronitrile; inorganic compounds, such as potassium persulfate and redox couples, such as ferrous ammonium sulfate/ammonium persulfate. Initiator addition may be effected any time prior to the actual polymerization per se. Polymerization may also be effected by photochemical irradiation processes, such as ultraviolet irradiation or by ionizing irradiation from a cobalt 60 source.

The resultant backbone microemulsion contains from about 20% to about 40% of aqueous phase polymer solids, preferably from about 30 to about 40%.

The formaldehyde and secondary amine are added after the inverse microemulsion polymerization of the (alk) acrylamide and reacted therewith to form the tertiary aminomethyl group on the (alk)acrylamide polymer backbone. At least 1 mole percent of the aminomethyl groups are added to the polymer during the Mannich reaction, preferrably from about 10 to about 50 mole percent.

The Mannich polymers produced by the procedures of the present invention are then quaternized as is known in the art, such as by reacting the Mannich polymers with such quaternizing agents as methyl chloride, dimethyl sulfate, and the like under known conditions. The resultant microemulsions have a Standard Viscosity of at least about 3.3 cps, preferrably at least about 4.0 cps.

The polymers of the present invention can conveniently be employed as flocculants prepared in the form of dilute aqueous solutions. These solutions can be prepared by inverting the microemulsion into water, optionally in the presence of a breaker surfactant, or by recovering the polymer from the microemulsion, such as by stripping or by adding the microemulsion to a solvent which precipitates the polymer, e.g. isopropanol or acetone, filtering off the resultant solids, drying and redispersing in water. The microemulsion can also be stripped to increase the percentage of polymer solids thereof.

Concentrating dispersions of suspended solids is carried out by adding an effective amount of the compositions of this invention, in solution form, to the suspension to remove water therefrom to produce an effluent of desired characteristics.

The products of this invention are useful in facilitating a wide range of solid-liquid separation operations. The polymers may be used in the dewatering of biologically treated suspensions, such as sewage and other municipal or industrial sludges, the drainage of cellulosic suspension such as those found in paper production, e.g. paper waste and the settlement of various inorganic suspensions, i.e. refinery waste, food waste, etc.

The following examples are set forth for purposes of illustration only and are not to be construed as limitations on the invention except as set forth in the appended claims. All parts and percentages are by weight unless otherwise specified.

Standard viscosity (SV) is measured in cps. by adding 10.8 parts of a 10.87% aqueous solution of sodium chloride to 10.0 parts of a 0.2% aqueous polymer solution. The resultant mixture is stirred for five minutes and the viscosity determined at 25±0.1° C. using a Brookfield viscometer Model DV II with UL adapter at 60 rpm.

EXAMPLE 1

Example 1 describes the preparation of a high standard viscosity, quaternary Mannich microemulsion (QMM) flocculant. Testing methods and results with this product are also included.

Microemulsion Preparation (Step A)

123.74 Parts of an aqueous solution containing 37.12 parts of acrylamide (AMD), 0.07 part of disodium salt of ethylenediaminetetraacetic acid ($Na_2EDTA$), and 2.33 parts of acetic acid.. The aqueous solution is added to an organic solution containing 110.92 parts of an isoparaffinic solvent (IPS) having a b.p. of 207°–254° C., 11.59 parts of polyoxyethylenesorbitol hexaoleate (PESH), and 3.75 parts of sorbitan sesquioleate (SS). The resultant media is subsequently sparged with nitrogen for 30 minutes at a flow rate of 500 mL/min.

The nitrogen sparge is then lowered to 200 mL/min. and 0.04 part isopropanol (IPA) and an aqueous solution containing 0.0056 part sodium bromate which is presparged are added. Sparging is continued for approximately five minutes. Polymerization is initiated by the introduction of 0.1% $SO_2$ in nitrogen at a flow rate of 10–20 mL/min. The polymerization exotherm is held to 30° C. by cooling.

The result is a clear and stable poly(acrylamide) microemulsion with aqueous phase polymer solids of 30% and having an SV of 5.2 cps.

DMAM Preparation (Step B)

N,N-dimethylaminomethanol (DMAM) is prepared by slowly adding 21.2 parts of 92.5% paraformaldehyde to an appropriate flask containing 48.6 parts of a 60% aqueous solution of dimethylamine and 22.1 parts of deionized water, keeping the exotherm below 25° C. Upon dissolution of the paraformaldehyde, 1.51 parts of methanol, 2.75 parts of dicyanamide, and 3.86 parts of 97.9% sodium metabisulfite are added for stabilization. After stirring for one hour, insolubles, if any, are allowed to settle, and the clear solution containing 49 parts of DMAM solids is decanted.

Mannich PAM Microemulsion Preparation (Step C)

100 parts of the above polyacrylamide microemulsion from Step A are placed in a suitable reactor. 3.26 parts of the surfactant system used in the microemulsion preparation is stirred in over 20 minutes. 8.28 parts of IPS are then stirred into the system. 31.4 parts of the above DMAM solution from Step B are added to the reactor at a rate of 0.53 mL/min with ample stirring. Subsequent to the addition, the reaction is heated to 35° C. and held for 4.5 hours. The Mannich polymer microemulsion is stored under refrigeration. It has an SV of 5.3 cps.

Quaternary Mannich PAM Microemulsion Preparation (Step D)

The Mannich product from Step C is transferred to a Parr Series 4560 mini-reactor and stirred. The reactor is evacuated to 100 torr and heated to 30° C. 13.45 Parts of methyl chloride gas are delivered at 30 psig. Upon completion of the methyl chloride charge, the reactor is heated to 35° C. for 16 hours. The reactor is then slowly evacuated to 100 torr and maintained for 30 minutes to strip excess methyl chloride. The quaternary microemulsion (QMM) product is clear and stable with an SV of 4.2 cps at pH 7.

Heat Treatment of Quaternary Mannich PAM Microemulsion (optional)

25.0 Parts of the above quaternary microemulsion from Step D are charged to an appropriate vessel and stirred vigorously. 0.75 Part of alkylaryl polyethylene glycol ether (AAPEG) is added over 15 minutes. 5.0 Parts of an aqueous solution containing 0.66 part of acetic acid (glacial, aldehyde free) and 0.30 part of urea are added to the flask at the rate of 0.12 mL/min. The microemulsion is then transferred to a pre-heated (60° C.) oven for 16 hours. The resultant product is a quaternary Mannich microemulsion (QMM) with an SV of 3.8 cps.

EXAMPLE 2 (comparative)

A microemulsion is prepared similarly to Example 1 with the following exceptions: 123.74 parts of an aqueous solution containing 56.5 parts AMD, 0.11 parts $Na_2EDTA$, and 3.39 parts acetic acid are added to an organic solution containing 102.75 parts IPS, 16.33 parts PESH, and 7.18 parts SS. 0.48 Part of IPA and an aqueous solution containing 0.0085 part of sodium bromate which is presparged is added prior to initiation with the introduction of 0.1% $SO_2$ in nitrogen at the flow rate of 30–85 mL/min. The exotherm is run nearly adiabatically to a temperature of approximately 65° C. to result in a microemulsion having an aqueous phase polymer solids content of 45.7%. The microemulsion is diluted to 18.8% with IPS and 119.41 parts of DMAM solution are added. Finally, 13.78 parts of AAPEG are added to the Mannich product and transferred to the Parr reactor system where 47.23 parts of methyl chloride gas is delivered. The resultant QMM has an SV of 2.5 cps at pH 7.

Performance Testing

Paper Recycling Sludge

The efficiency of dewatering and clarifying a typical municipal sewage sludge is determined as follows: 200 parts of sludge is weighed into a square beaker. Aqueous solutions of the quaternary flocculants of Examples 1 and 2 are prepared by adding the microemulsion to water so that the polymer concentration is 0.2 weight percent. Various doses of the polymer solutions are added to the sludge samples with water being added to the polymer solution to yield an equivalent addition each dose. The mixture is then agitated for 5 seconds and poured through a Buchner funnel containing a filter cloth. The free drainage is determined by measuring the volume of filtrate collected in 10, 20 and 30 seconds. A sample of the filtrate is then collected for filtrate turbidity measurement. The results are set forth in Table 1, below.

| QMM of Example # | Dose (mL) | Free Drainage (mL) | Turbidity (NTU) |
|---|---|---|---|
| 1 | 6 | 36 | >1000 |
|   | 8 | 104 | 175 |
|   | 10 | 118 | 44 |
|   | 12 | 106 | 99 |
| 2 | 6 | 20 | >1000 |
|   | 8 | 30 | >1000 |
|   | 10 | 50 | 705 |
|   | 12 | 80 | 366 |

EXAMPLE 3

A microemulsion is prepared similarly to Example 1 with the following exceptions: 123.74 parts of an aqueous solution containing 49.50 parts of AMD, 0.10 part of $Na_2EDTA$, and 2.97 parts of acetic acid are added to an organic solution containing 110.92 parts of IPS, 10.66 parts of PESH, and 4.68 parts of SS. The resultant media is then sparged as in Example 1.

The nitrogen sparge is then lowered to 200 mL/min and 0.50 part of a 10% solution of IPA and an aqueous solution containing 0.0074 part of sodium bromate which is presparged are added. Polymerization is then conducted as in Example 1 holding the exotherm to 45° C.

The result is a clear and stable polyacrylamide microemulsion (SV=4.28 cps) having 40% polymer solids in the aqueous phase.

This microemulsion is then subjected to a Mannich reaction as in Example 1 with the following exceptions: 12.52 parts of IPS are stirred into the system with subsequent addition of 41.85 parts of the DMAM solution, resulting in a clear and stable Mannich product (SV=4.67 cps).

The Mannich product is then quaternized as in Example 1 with the exception of the use of 17.83 parts of methyl chloride. The quaternary Mannich microemulsion product is clear and stable with an SV measured at pH 7 of 3.54 cps.

EXAMPLE 4

The QMM from example 3 is heat treated similarly to Example 1 with the following exception: 4.9 parts of an aqueous solution containing 0.35 part of lactic acid and 0.37 part of urea is added to 25 parts of the QMM. The resultant product is a heat treated QMM with an SV of 3.41 cps.

EXAMPLE 5 (comparative)

A microemulsion is prepared similarly to Example 3 with the following exceptions: 123.74 parts of an aqueous solution containing 56.50 parts of AMD, 0.11 part of $Na_2EDTA$, and 3.39 parts of acetic acid are added to the organic solution which is then sparged as in Example 1.

The nitrogen sparge is then lowered to 200 mL/min and 0.57 part of a 10% solution of IPA and an aqueous solution containing 0.0085 part sodium bromate which is presparged are added. Polymerization is then effected as in Example 1 holding the exotherm to 45° C. The result is a clear and stable polyacrylamide microemulsion (SV=4.10 cps) having a 45.7% aqueous phase polymer solids content.

This microemulsion is then subjected to a Mannich reaction as in Example 3 with the following exceptions: 47.76 parts of the DMAM solution are added resulting in a clear and stable Mannich product (SV=4.32 cps).

The Mannich product is then quaternized as in Example 1 with the exception of the use of 20.46 parts of methyl chloride charge. The quaternary Mannich microemulsion product is clear and stable with an SV measured at pH 7 of 2.95 cps.

EXAMPLE 6 (comparative)

The QMM from Example 5 is heat treated similarly to Example 4. The resultant product is a heat-treated QMM-HT with an SV of 2.81 cps.

Performance Testing

The performances of the products of Examples 3—6 are shown below in Table 2 testing being conducted as indicated above.

TABLE 2

| QMM of Example # | Dose (mL) | Free Drainage (mL) | Turbidity (NTU) |
|---|---|---|---|
| 3 | 12 | 64 | 514 |
|  | 14 | 100 | 129 |
|  | 16 | 94 | 46 |
|  | 18 | 94 | 94 |
| 4 | 12 | 55 | 714 |
|  | 14 | 90 | 151 |
|  | 16 | 114 | 31 |
|  | 18 | 90 | 97 |
| 5 | 12 | 54 | 564 |
|  | 14 | 86 | 176 |
|  | 16 | 104 | 20 |
|  | 18 | 105 | 59 |
| 6 | 12 | 43 | >1000 |
|  | 14 | 60 | 564 |
|  | 16 | 88 | 163 |
|  | 18 | 130 | 50 |

EXAMPLE 7

Following the procedure of Example 3 except that 10% of the acrylamide is replaced with acrylic acid, similar results are achieved.

EXAMPLE 8

The procedure of Example 7 is again followed except that the quaternizing agent is dimethyl sulfate. The results are similar.

EXAMPLE 9

When formalin is used in place of the paraformaldehyde of Example 1, similar results are achieved.

EXAMPLE 10

Methacrylamide is used in place of the acrylamide of Example 1. The results are similar.

EXAMPLE 11

The procedure of example 3 is again followed except that the monomers employed are acrylamide (90%) diallyldimethylammonium chloride (8%) and methyl acrylate (2%). Similar results are achieved.

EXAMPLE 12

The quaternized, Mannich polymer microemulsion of Example 7 is inverted into water in the presence of an emulsifier and the resultant solution (2% active) is used to treat a paper-making process waste system. Excellent results are observed.

EXAMPLE 13

The procedure of Example 12 is again followed except that the solids dispersion treated is food waste from a food processing plant. Again, the results are excellent.

We claim:

1. An inverse microemulsion comprising an aqueous phase of dispersed micelles containing water and an (alk) acrylamide-based polymer substituted with at least about 1 mole percent of quaternized tertiary aminomethyl groups and having a Standard Viscosity of at least 3.3 cps.

2. A microemulsion as claimed in claim 1 wherein the average particle size of said micelles is less than about 2000 Å in diameter.

3. A microemulsion as claimed in claim 1 wherein said polymer is quaternized with methyl chloride.

4. A microemulsion as claimed in claim 1 wherein said (alk)acrylamide-based polymer is polyacrylamide.

5. A microemulsion as claimed in claim 3 wherein said tertiary aminomethyl groups are derived from a formaldehyde and dimethylamine.

* * * * *